(12) United States Patent
Okandan et al.

(10) Patent No.: US 8,680,810 B1
(45) Date of Patent: Mar. 25, 2014

(54) MICROSCALE AUTONOMOUS SENSOR AND COMMUNICATIONS MODULE

(75) Inventors: Murat Okandan, Edgewood, NM (US); Gregory N. Nielson, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 396 days.

(21) Appl. No.: 13/240,354

(22) Filed: Sep. 22, 2011

(51) Int. Cl.
*H01M 10/46* (2006.01)

(52) U.S. Cl.
USPC .......................................... 320/107

(58) Field of Classification Search
USPC .......... 320/101, 103, 107, 112, 128; 324/426, 324/427
See application file for complete search history.

(56) References Cited

U.S. PATENT DOCUMENTS

| | | |
|---|---|---|
| 6,400,272 B1 | 6/2002 | Holtzman et al. |
| 7,314,382 B2 | 1/2008 | Nolan |
| 7,451,537 B2 | 11/2008 | Liu et al. |
| 7,514,046 B2 | 4/2009 | Kechagia et al. |
| 8,340,528 B2 * | 12/2012 | Tatum et al. ................. 398/138 |
| 2006/0055541 A1 | 3/2006 | Bleckmann |
| 2008/0290353 A1 | 11/2008 | Medendorp, Jr. et al. |
| 2009/0240299 A1 * | 9/2009 | Adekore et al. ................ 607/14 |

\* cited by examiner

*Primary Examiner* — Edward Tso
(74) *Attorney, Agent, or Firm* — Medley Behrens & Lewis LLC; Michael J. Medley

(57) ABSTRACT

Various technologies pertaining to a microscale autonomous sensor and communications module are described herein. Such a module includes a sensor that generates a sensor signal that is indicative of an environmental parameter. An integrated circuit receives the sensor signal and generates an output signal based at least in part upon the sensor signal. An optical emitter receives the output signal and generates an optical signal as a function of the output signal. An energy storage device is configured to provide power to at least the integrated circuit and the optical emitter, and wherein the module has a relatively small diameter and thickness.

20 Claims, 5 Drawing Sheets

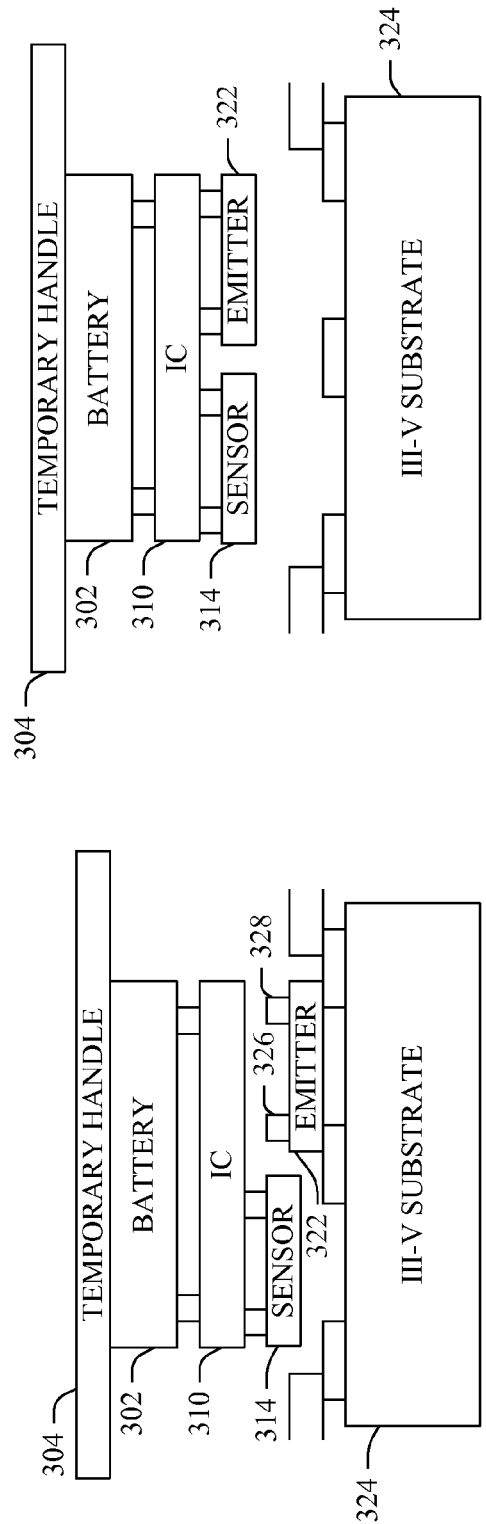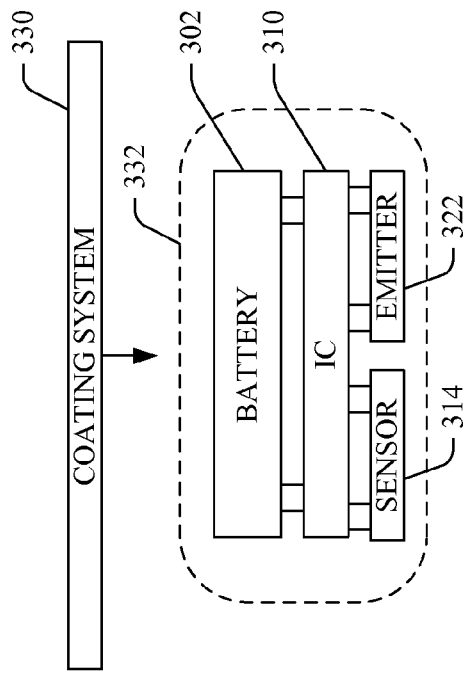

MICROSCALE AUTONOMOUS SENSOR AND COMMUNICATIONS MODULE

STATEMENT OF GOVERNMENTAL INTEREST

This invention was developed under contract DE-AC04-94AL85000 between Sandia Corporation and the U.S. Department of Energy. The U.S. Government has certain rights in this invention.

BACKGROUND

Sensors are being manufactured in ever decreasing sizes. For example, credit cards are issued with radio frequency identifier (RFID) tags embedded thereon that are energized when subjected to radio frequencies of certain wavelengths. In an exemplary application, a radio wave emitter that is external to the card can be configured to output radio waves at a certain frequency, which is configured to energize the RFID tag. Responsive to the RFID tag being energized, such tag can emit data by way of an antenna at a frequency that is monitored by an RFID reader. Such data can be indicative of the identity of the owner of the credit card, the account number of the credit card, an expiration date of the credit card, or the like. When the RFID tag ceases to receive energizing radio waves from the radio wave emitter, the RFID tag ceases to emit data.

In another example, an RFID tag can include a power source. In such a configuration, the RFID tag is configured to continuously (or periodically) output a signal until a charge of the battery is dissipated. In most commercial applications, the RFID tags do not include a power source, due to size constraints and costs corresponding to batteries.

In either configuration, RFID tags can be relatively small in size. Reduction in size of RFID tags, however, is limited, as RFID tags include an antenna to output data by way of radio waves. Furthermore, RFID tags are generally not autonomous, as typically RFID tags must be activated by an external energy source to output data.

SUMMARY

The following is a brief summary of subject matter that is described in greater detail herein. This summary is not intended to be limiting as to the scope of the claims.

Described herein are various technologies pertaining to a microscale autonomous sensor and communications module. For example, a microscale autonomous sensor and communications module may be on the order of millimeters in diameter and thickness. In an exemplary embodiment, the microscale autonomous sensor and communications module can include an energy storage device, such as a capacitor, an ultra-capacitor, or a thin-film solid-state battery. For instance, the thin-film solid state battery can be a thin-film rechargeable lithium battery, a thin-film rechargeable lithium ion battery, or the like.

The microscale autonomous sensor and communications module additionally includes an integrated circuit that comprises memory, wherein the memory includes instructions for operating the module. In an example, the integrated circuit may be a dual-sided integrated circuit that can be accessed (contacted) on either side thereof. For instance, the battery can be contacted with the integrated circuit on a first side of the integrated circuit (by way of solders or epoxy bumps). Further, the memory of the integrated circuit may comprise non-volatile memory that can retain information that is indicative of a current state of the module and/or a parameter sensed by the module. In an example, the state of the module may be a function of an environmental parameter and/or a previous state of the module.

The microscale autonomous sensor and communications module can further include at least one sensor that is configured to output a sensor signal that is indicative of at least one environmental parameter monitored by the sensor. Exemplary environmental parameters include temperature, existence (or lack of existence) of a chemical, electromagnetic radiation of a defined wavelength or range of wavelengths (ultraviolet, infrared, visible), humidity, pressure, or other suitable environmental parameter. In an exemplary embodiment, the sensor can be a photovoltaic cell that is configured to sense electromagnetic radiation of certain wavelengths. Furthermore, the photovoltaic cell can have a first side and a second side, and both positive and negative contacts may be on the first side of the photovoltaic cell. These positive and negative contacts can be contacted with corresponding contacts on the second side of the integrated circuit, such that the photovoltaic cell is electrically coupled to the energy storage device by way of the integrated circuit.

The microscale autonomous sensor and communications module further comprises an optical emitter that is configured to output an optical signal. In an exemplary embodiment, the optical emitter can be configured to output the optical signal based at least in part upon the sensor value output by the sensor (and therefore based at least in part upon the environmental parameter). In another exemplary embodiment, the integrated circuit can comprise executable instructions that cause the optical emitter to output an optical signal without reference to the output of the sensor. For instance, the executable instructions in the integrated circuit can cause the optical emitter to randomly output an optical signal. In another example, the executable instructions can cause the optical emitter to output an optical signal in a predefined sequence.

In an exemplary embodiment, the optical emitter can be one of a light emitting diode (LED) or a vertical cavity surface emitting laser (VCSEL). In an exemplary embodiment, the optical emitter can output the optical signal based at least in part upon a state of the module that is retained in non-volatile memory on the integrated circuit. In other words, the integrated circuit can receive the sensor signal output by the sensor, and the integrated circuit can generate an output signal as a function of the sensor signal. The output signal is transmitted to the optical emitter, which outputs an optical signal based at least in part upon the output signal. Therefore, in an example, if the sensor senses the environmental parameter, the integrated circuit can cause an output signal to be transmitted to the optical emitter that causes the optical emitter to output an optical signal of a particular wavelength and amplitude. Accordingly, an individual or other microscale autonomous sensor and communications module can be provided with information that indicates the existence of the environmental parameter.

As mentioned above, the integrated circuit can also take into consideration the state of the module when transmitting the output signal to the optical emitter. For instance, the integrated circuit can cause the optical emitter to output an optical signal of a first wavelength and first amplitude upon the sensor detecting a first occurrence of the environmental parameter and can thereafter cause the optical emitter to output an optical signal of a second wavelength and second amplitude upon the sensor sensing a second occurrence of the environmental parameter. Thus, the instructions in the memory may be self-modifying.

Further, the integrated circuit can be configured to monitor charge of the energy storage device and voltage generated by the photovoltaic cell and control distribution and usage of electric power between the integrated circuit, the energy storage device, the sensor, and the optical emitter. Therefore, in an exemplary embodiment, the microscale autonomous sensor and communications module can continuously operate over a relatively long period of time.

The optical emitter may have both positive and negative contacts on a same side of the optical emitter, and can be contacted with the integrated circuit by way of solders and/or epoxy bumps adjacent to the sensor. The energy storage device can be positioned on the opposing side of the integrated circuit, such that both the optical emitter and the sensor are electrically coupled to the energy storage device by way of the integrated circuit.

Other aspects will be appreciated upon reading and understanding the attached figures and description.

BRIEF DESCRIPTION OF THE DRAWINGS

FIGS. 3A-G illustrate manufacture of a microscale autonomous sensor and communications module.

DETAILED DESCRIPTION

Figure 1:
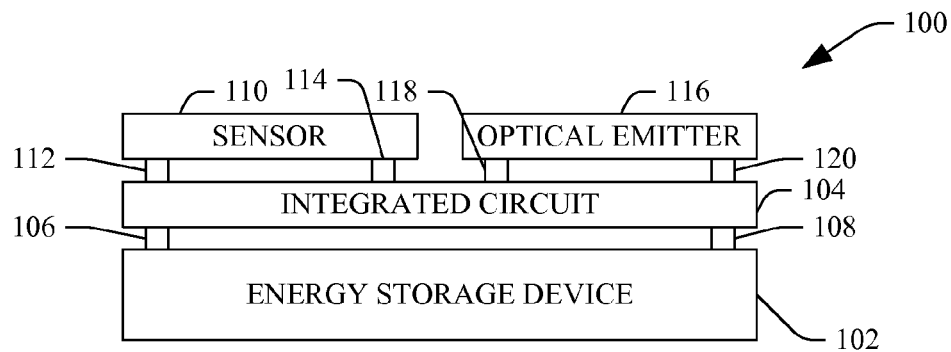
FIG. 1 is an exemplary diagram of a microscale autonomous sensor and communications module.

Various technologies pertaining to a microscale autonomous sensor and communications module will now be described with reference to the drawings, where like reference numerals represent like elements throughout. Further, as used herein, the term "exemplary" is intended to mean serving as an illustration or example of something, and is not intended to indicate a preference.

With reference now to FIG. 1, an exemplary microscale autonomous sensor and communications module 100 is illustrated. In an example, the module 100 may be less than 2 mm in diameter and less than 2 mm in thickness. In another example, the module 100 may less than 1 mm in diameter and less than 1 mm in thickness. In still yet another example, the module 100 may be less than 1 mm in diameter and less than 50 μm in thickness.

The module 100 comprises an energy storage device 102. The energy storage device 102 may be a capacitor, an ultracapacitor, or a rechargeable thin film lithium battery, such as a rechargeable thin film lithium battery or a rechargeable thin film lithium ion battery. It is to be understood, however, that the energy storage device 102 may be any suitable energy storage device, and such energy storage devices are intended to fall within the scope of the hereto-appended claims.

The module 100 can also comprise an integrated circuit 104, wherein the integrated circuit includes a memory that comprises executable instructions and/or state information pertaining to a state of the module 100. Accordingly, instructions executing on the integrated circuit 104 can modify values in the memory based at least in part upon a current state of the module 100. In an example, the integrated circuit 104 can be a dual-sided integrated circuit that can have a first side and a second side that is opposite the first side, where the first side includes at least one positive contact and one negative contact and the second side includes at least two positive contacts and at least two negative contacts. The energy storage device 102 can be contacted with the integrated circuit 104 by solders and/or epoxy bumps on the first side of the integrated circuit 104. In other words, the integrated circuit 104 is electrically coupled to the energy storage device 102 by way of contacts 106 and 108.

The module 100 further comprises a sensor 110 that is electrically connected to the integrated circuit 104 by way of contacts 112 and 114 on the second side of the integrated circuit 104. The sensor 110 can be configured to output a sensor signal that is indicative of at least one environmental parameter pertaining to the module 100. This environmental parameter, for instance, can be, but is not limited to being, electromagnetic radiation of a particular wavelength, existence (or lack of existence) of a certain chemical, temperature, humidity, pressure, or other suitable environmental parameter. In an exemplary embodiment, the sensor 110 can be a photovoltaic cell that is configured to generate voltage responsive to receipt of electromagnetic radiation of a particular wavelength. Such wavelength may be ultraviolet, x-rays, gamma rays, infrared, visible light, or other suitable wavelength. The sensor 110 can output the sensor signal to the integrated circuit 104 by way of the electrical contacts 112 and 114. In an example, the electrical contacts 112 and 114 may be on a same side of the sensor 110. An exemplary sensor (a photovoltaic cell) that has positive and negative contacts on a same side is described in U.S. patent application Ser. No. 13/164,017, filed on Jun. 20, 2011, and entitled "SOLAR CELL WITH BACK SIDE CONTACTS", the entirety of which is incorporated herein by reference. Having both positive and negative contacts on a single side of the sensor can increase a surface area of the sensor 110 that can be employed for detecting the environmental parameter.

The integrated circuit 104 can be programmed to monitor the sensor signal output by the sensor 110 and can generate an output signal based at least in part upon the sensor signal. Pursuant to an example, the executable instructions in the memory of the integrated circuit 104 can cause the integrated circuit 104 to receive the sensor signal and generate the output signal based at least in part upon the sensor signal. Additionally, the instructions can cause the output signal to be generated based at least in part upon a current state of the module 100, wherein such state can be retained in the memory of the integrated circuit 104. Such state information can be updated by the executable instructions as sensor signals are received from the sensor 110. Further, at least a portion of the memory of the integrated circuit can be non-volatile in nature, such that state information can be retained if the module 100 lacks sufficient power to operate the integrated circuit 104.

The module 100 can further include an optical emitter 116 that is electrically connected to the second side of the integrated circuit by way of electric contacts 118 and 120. In an example, the optical emitter 116 can be a light emitting diode (LED), a vertical cavity surface emitting laser (VCSEL), or other suitable optical emitter. In an exemplary embodiment, the optical emitter 116 can receive the output signal from the integrated circuit 104 and output an optical signal responsive to receipt of the output signal from the integrated circuit 104. For example, the output signal can be voltage at a particular level that causes the optical emitter 116 to output an optical signal with a particular wavelength and amplitude.

The energy storage device 102 can be configured to provide electric power to the integrated circuit 104, the sensor 110, and/or the optical emitter 116. As shown, the energy storage device 102 can provide electric power to the sensor 110 and/or the optical emitter 116 by way of the integrated circuit 104.

As mentioned above, in an exemplary embodiment, the sensor 110 can be or include a photovoltaic cell or other suitable sensor that can generate energy as a function of a renewable energy resource. For instance, the sensor 110 can be configured to generate voltage responsive to the sensor 110 receiving electromagnetic radiation of a specified wavelength. The instructions in the integrated circuit 104 can be configured to manage distribution of electric power amongst the energy storage device 102, the integrated circuit 104, the sensor 110, and/or the optical emitter 116 based at least in part upon an amount of energy generated by the sensor 110, an amount of charge in the energy storage device 102, an amount of power needed to execute the instructions in the integrated circuit 104, and/or an amount of energy needed to drive the optical emitter 116. For example, if the energy storage device 102 is fully charged and the sensor 110 generates a voltage, the integrated circuit 104 can utilize the voltage generated by the sensor 110 and direct voltage to the optical emitter 116, such that energy of the energy storage device 102 is not employed to drive the integrated circuit 104 or the optical emitter 116. In another exemplary embodiment, the integrated circuit 104 can monitor an amount of voltage generated by the sensor 110 and can ascertain that such amount of voltage is insufficient to operate the optical emitter 116. Accordingly, the integrated circuit 104 can cause the optical emitter 116 to be provided with electric power from the energy storage device 102. This allows the module 100 to continuously operate autonomously.

While the exemplary microscale autonomous sensor and communications module has been shown and described above as comprising an energy storage device that is separate from the integrated circuit 104, in an exemplary embodiment the energy storage device 102 can be integrated in the integrated circuit 104. In such an exemplary embodiment, the energy storage device 102 can be a capacitor that is configured to provide a relatively limited amount of power to the integrated circuit 104 and/or the optical emitter 116.

Further, the examples set forth above indicate that the integrated circuit 104 causes the optical emitter 116 to emit an optical signal based at least in part upon an environmental condition sensed by the sensor 110. It is to be understood, however, that in other exemplary embodiments the integrated circuit 104 can be programmed with executable instructions that cause the optical emitter 116 to output an optical signal without reference to a signal output by the sensor 110. For instance, the integrated circuit can cause data received by the sensor 110 to be retained in non-volatile memory, while causing the optical emitter 116 to output an optical signal in accordance with predefined (static) program instructions.

Moreover, the microscale autonomous sensor and communications module 100 is shown as including a separate sensor and optical emitter. In an exemplary embodiment, the sensor 110 and the optical emitter 116 can be integrated in a single device. For instance, a GaAs cell can function as both a sensor of radiation of a certain wavelength as well as an optical emitter. Further, in another exemplary embodiment, the energy storage device 102, the integrated circuit 104, the sensor 110, and the optical emitter 116 can be fabricated on a same chip.

Figure 2:
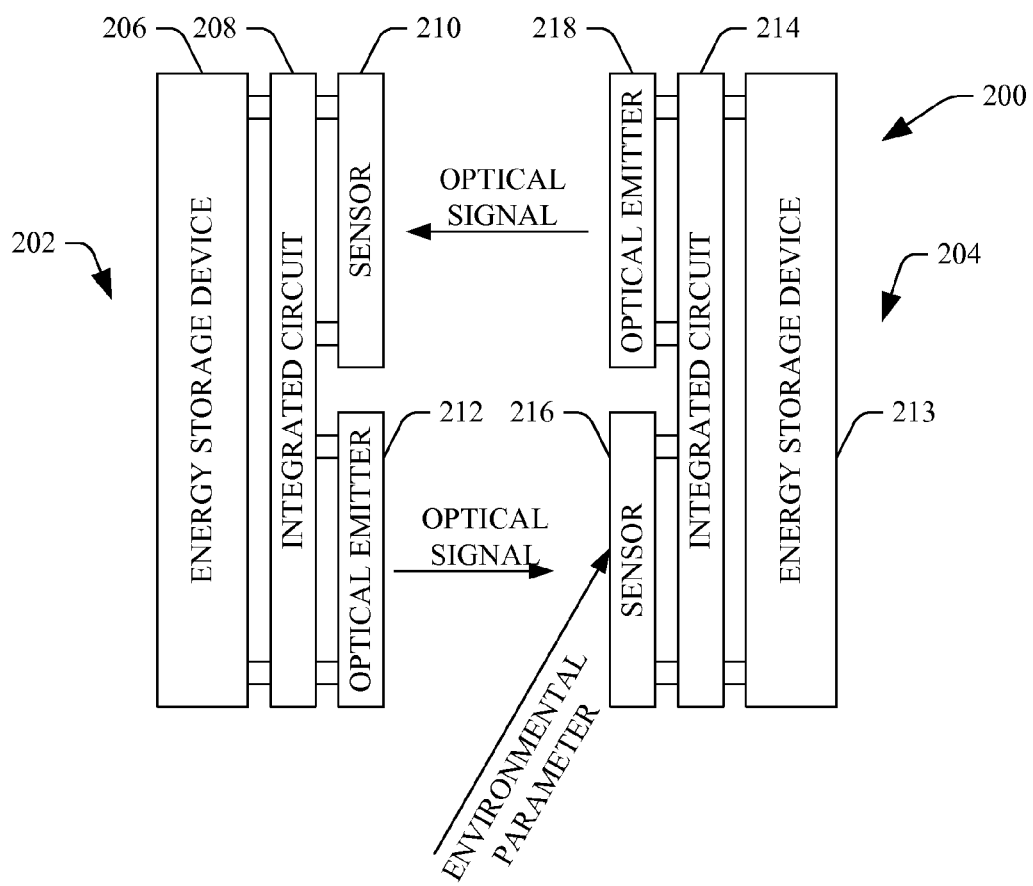
FIG. 2 is a diagram illustrating two different microscale autonomous sensor and communication modules interacting with one another.

Referring now to FIG. 2, an exemplary system 200 that facilitates interaction between microscale autonomous sensor and communication modules is illustrated. The system 200 comprises a first microscale autonomous sensor and communications module 202 and a second microscale autonomous sensor and communications module 204. The first module 202 comprises an energy storage device 206, an integrated circuit 208, a sensor 210, and an optical emitter 212, which interact with one another as described above. The second module 204 likewise includes an energy storage device 213, an integrated circuit 214, a sensor 216, and an optical emitter 218, which can act in conjunction as described above.

In the example shown in FIG. 2, the sensor 216 of the second module 204 is configured to sense an environmental parameter, which can be any suitable environmental parameter. The integrated circuit 214 of the second module 204 receives the sensor signal output by such sensor 216, which (in the example shown in FIG. 2) can indicate the existence of the environmental parameter. The integrated circuit 214 then generates an output signal based at least in part upon the sensor signal (and optionally, state of the second module 204). The integrated circuit 214 may then direct the output signal to the optical emitter 218 (powered by the sensor 216 and/or the energy storage device 213), and the optical emitter 218 can output an optical signal responsive to receiving the output signal from the integrated circuit 214.

The sensor 210 of the first module 202 may be configured to sense electromagnetic radiation of wavelengths that include a wavelength of the optical signal output by the optical emitter 218 of the second module 204. The sensor 210 of the first module 202 can output a sensor signal that indicates the existence of the optical signal generated by the optical emitter 218, and such sensor signal can be received by the integrated circuit 208 of the first module 202. Based at least in part upon such sensor signal (and optionally, state information in the memory of the integrated circuit 208), the integrated circuit 208 can generate an output signal and provide such output signal to the optical emitter 212 of the first module 202. This causes the optical emitter 212 to output an optical signal. Such optical signal may be detected by yet another module (not shown) or by a human eye. Therefore, it can be ascertained that information pertaining to the existence of one or more environmental parameters can be relayed between microscale autonomous sensor and communications modules described herein, as well as relayed to human beings.

Various exemplary applications where the microscale autonomous sensor and communications modules shown in FIGS. 1 and 2 can be employed will now be described. It is to be understood that these applications are exemplary in nature, and employment of a microscale autonomous sensor and communications module is not intended to be limited by the exemplary applications discussed below. In a first exemplary application, it may be desirable to ascertain existence of a particular chemical (a chemical that corresponds to corrosion) in a set of piping utilized, for instance, in a nuclear power plant. Oftentimes, such piping is too small for automated robots to traverse the piping and monitor corrosion. Modules such as the ones described above can be equipped with sensors that are configured to sense a chemical that indicates corrosion in the piping. Responsive to detecting such chemical, the modules can be configured to output an optical signal that can inform a human of the existence of the chemical. For instance, the modules can be caused to traverse the piping and can be collected at a suitable exit point. There, optical signals emitted by the modules and/or information retained in non-volatile memory of the modules can be reviewed to determine whether corrosion exists in the piping.

In another exemplary application, modules such as those described with respect to FIGS. 1 and 2 can be employed in a toy. For instance, the modules can be utilized as snowflakes in a snow globe, wherein a subset of such modules are configured to output optical signals of a first wavelength and amplitude responsive to sensing electromagnetic radiation from the sun, while other modules are configured to output optical signals of a second wavelength and amplitude responsive to receiving optical signals from others of the modules. This can create an ever-changing light display that is based upon electromagnetic radiation received by certain modules in the snow globe.

In still yet another exemplary application, microscale autonomous sensor and communications modules can be employed in a floating display device (which can be, for instance, the snow globe mentioned above). For instance, the modules can be programmed with information pertaining to identities of other modules in the snow globe. Accordingly, a module can determine its position relative to another module in the snow globe due to the passing of information between modules (flashing of light of certain frequencies, etc.). Due to the knowledge of relative positions of the modules, a floating image can be created. In each of the above-described applications, the modules can communicate with one another in a "swarm" environment, such that modules can monitor for certain environmental parameters, can receive communications from other modules, and can output optical signals as a function of the environmental parameters, communications from the other modules, and internal states.

Figure 3B:
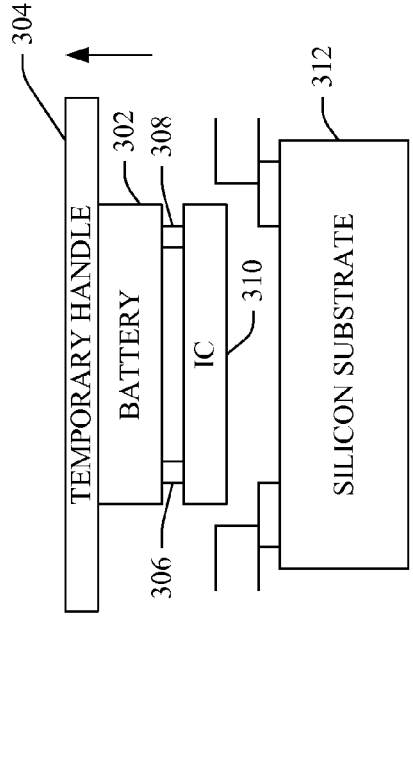
Figure 3A:
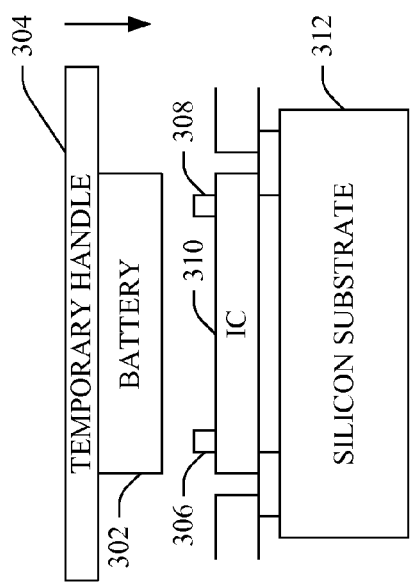

Now referring collectively to FIGS. 3A-3G, manufacture of an exemplary microscale autonomous sensor and communications module is illustrated. With reference now to FIG. 3A, a battery 302 is affixed to a temporary movable handle 304. While the handle 304 is shown and described as transporting the battery 302, it is to be understood that in other exemplary embodiments the handle 304 can be configured to transport some other suitable energy storage device. The handle 304, for instance, may be a glass wafer that can be coupled to machinery that can transport the handle 304 (and thus the battery 302 and modules connected to the battery 302) laterally and vertically. As shown in FIG. 3A, the temporary handle 304 is dropped in a vertical direction, causing the battery 302 to be in permanent physical and electrical contact with adhesive contacts 306 and 308 (solders and/or epoxy bumps) on an integrated circuit 310. The integrated circuit 310 can reside on a silicon substrate 312. As shown in FIG. 3B, the temporary handle 304 is then moved upward in the vertical direction, thereby allowing the integrated circuit 310 to be lifted off of the silicon substrate 312.

Figure 3D:
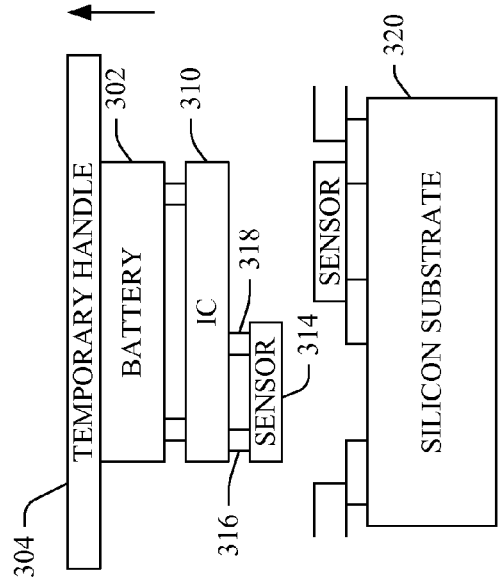
Figure 3C:
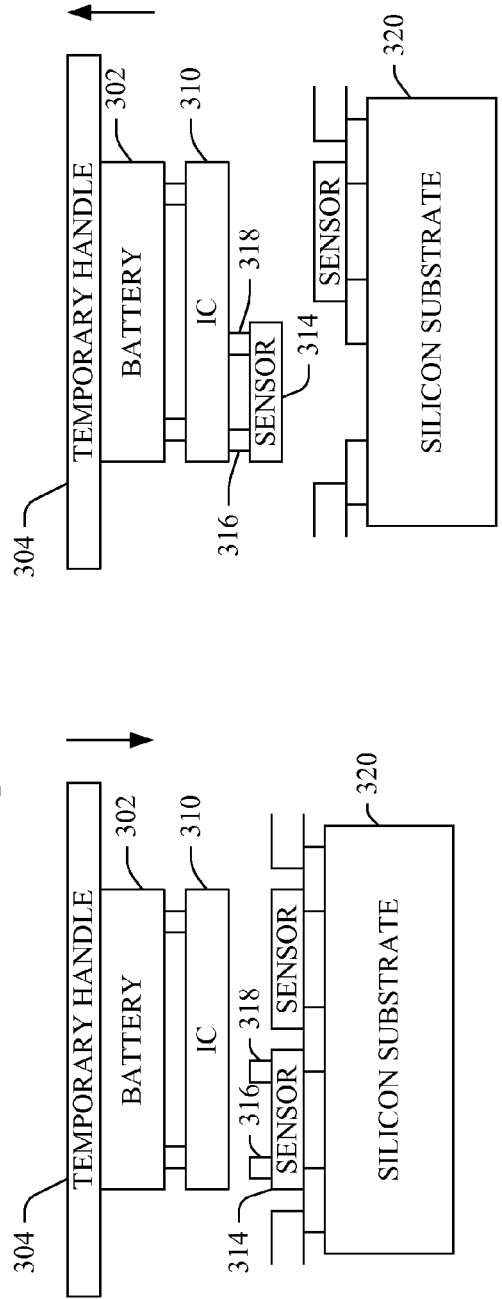

With reference now to FIG. 3C, the temporary handle 304 is transported in a horizontal direction, such that the battery 302 and the integrated circuit 310 are positioned above a sensor 314 that has a plurality of adhesive contacts 316 and 318 thereon. The sensor 314 resides on a silicon substrate 320. As shown in FIG. 3C, the temporary handle 304 is dropped in the vertical direction towards the sensor 314 until the integrated circuit 310 is coupled to the adhesive contacts 316 and 318, thereby permanently affixing the sensor 314 with the integrated circuit 310 and electrically contacting the sensor 314 with the integrated circuit 310. As shown in FIG. 3D, subsequent to the sensor 314 being affixed to the integrated circuit 310, the temporary handle 304 is moved upwards, such that the sensor 314 is lifted off of the silicon substrate 320.

With reference now to FIG. 3E, the temporary handle 304 is transported over a III-V substrate 324 that includes a plurality of optical emitters. The temporary handle 304 is moved downward to electrically (and permanently) contact with an optical emitter 322 by way of adhesive contacts 326 and 328.

Turning now to FIG. 3F, the temporary handle 304 is lifted upwards, thereby causing the emitter 322 to be lifted off of the III-V substrate 324. The module that comprises the battery 302, the integrated circuit 310, the sensor 314, and the optical emitter 322 can be removed from the temporary handle 304 by way of any suitable removal techniques. In an example, the battery 302, the integrated circuit 310, the sensor 314, and/or the optical emitter 322 can be removed from their respective handles/substrates by way of a chemical release process, a thermal release process, an optical release process, or other suitable release process.

Referring now to FIG. 3G, a coating system 330 is configured to apply a protective polymer coating 332 to the module that includes the battery 302, the integrated circuit 310, the sensor 314, and the optical emitter 322. This polymer coating 332 can protect the module from certain environmental conditions. While the polymer coating 332 is shown as being applied subsequent to each of the components of the module being assembled together, it is to be understood that a polymer coating 332 may be applied after the battery 302 has been contacted with the integrated circuit 310, and again after the combination of the battery 302 and the integrated circuit 310 has been contacted with the sensor 314, and again after the optical emitter 322 has been added to the module.

Figure 4:
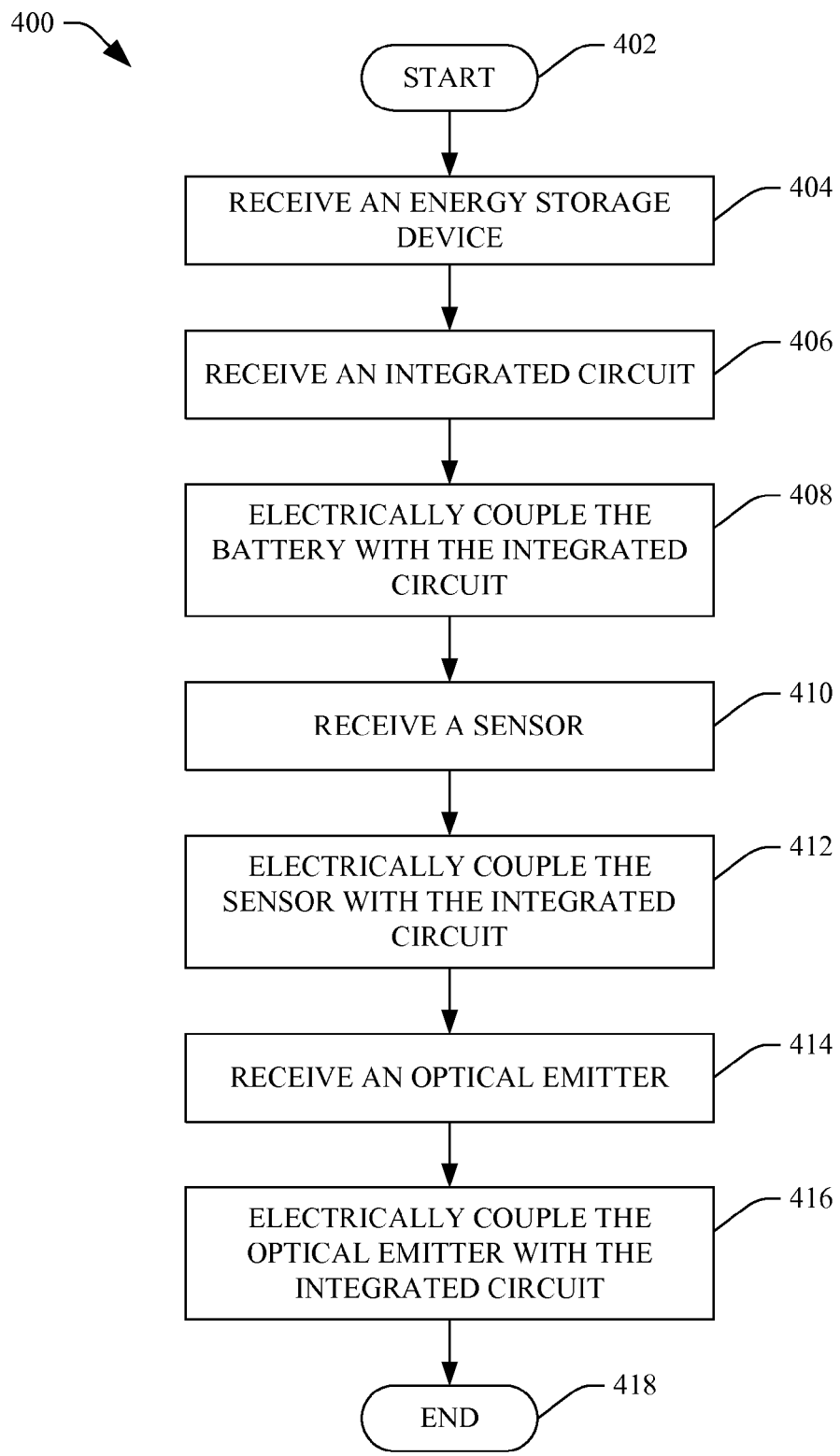
FIG. 4 is a flow diagram that illustrates an exemplary methodology for manufacturing a microscale autonomous sensor and communications module.
Figure 5:
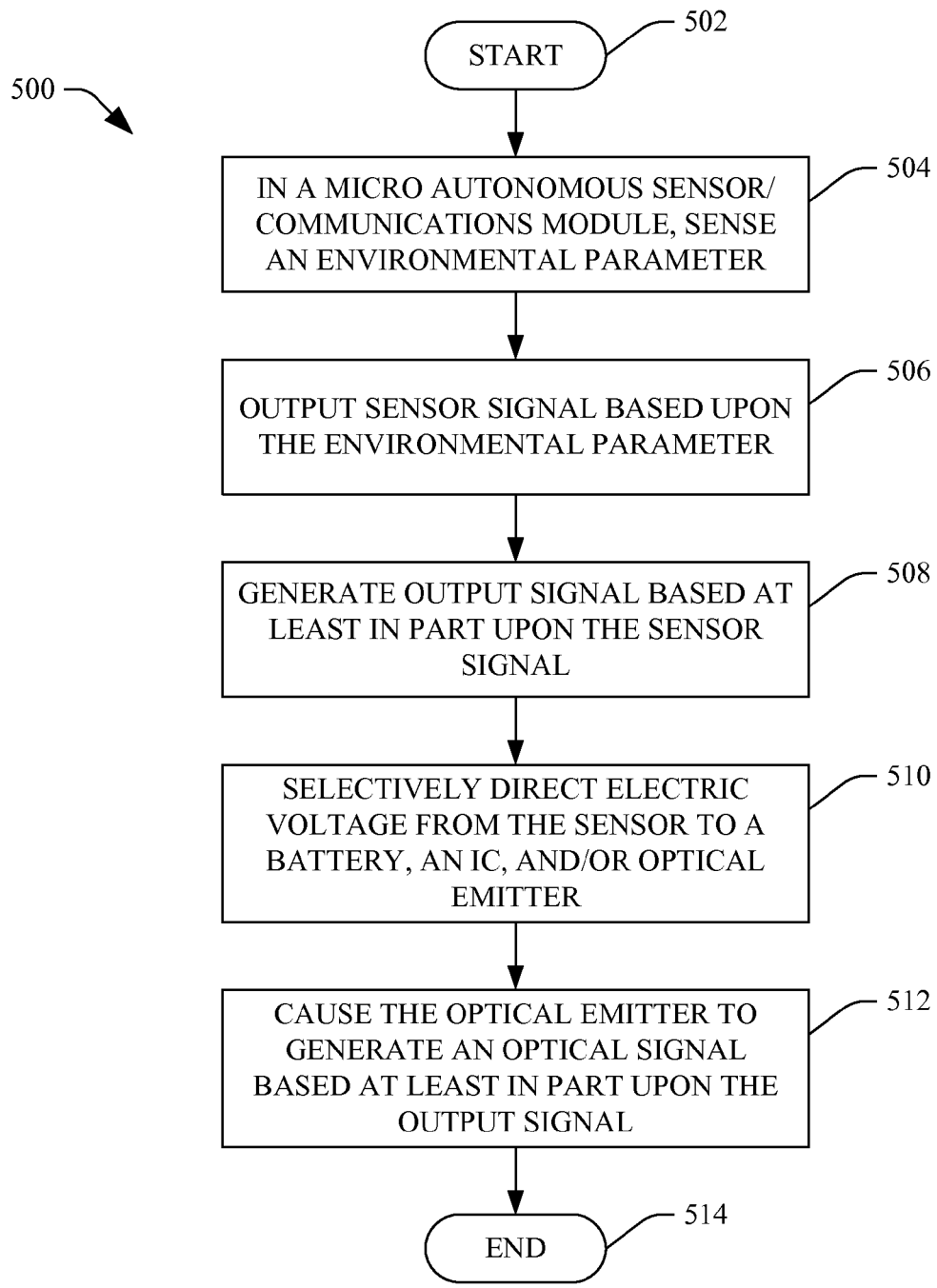
FIG. 5 is a flow diagram that illustrates an exemplary methodology for causing an optical emitter to output an optical signal based at least in part upon an environmental parameter sensed by a sensor in a microscale autonomous sensor and communications module.

With reference now to FIGS. 4-5, various exemplary methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Now referring solely to FIG. 4, an exemplary methodology 400 that facilitates manufacturing a microscale autonomous sensor and communications module is illustrated. The methodology 400 starts at 402, and at 404, a relatively small energy storage device, such as a thin film battery is received. At 406, an integrated circuit is received, wherein the integrated circuit is configured with memory that comprises executable instructions for generating an output signal based at least in part upon a sensor signal.

At 408, the battery is coupled with the integrated circuit by way of solders and/or epoxy bumps. At 410, a sensor is received, wherein the sensor is configured to output a sensor signal that pertains to an environmental parameter.

At 412, the sensor is electrically coupled with the integrated circuit by way of solders and/or epoxy bumps. Accordingly, the sensor is also electrically coupled with the energy storage device by way of the integrated circuit. At 414, an optical emitter is received, and at 416, the optical emitter is electrically coupled with the integrated circuit. The optical emitter can be placed adjacent to the sensor on a first side of a dual-sided integrated circuit, and the energy storage device can be on the opposite side of the dual-sided integrated circuit. Further, in an exemplary embodiment, the resulting module can be between 100 μm and 1 mm in diameter and between 10 μm and 1 mm in thickness. The methodology 400 completes at 418.

Turning now to FIG. 5, an exemplary methodology 500 that facilitates causing an optical signal to be output in a microscale autonomous sensor and communications module is illustrated. The methodology 500 starts at 502, and at 504 an environmental parameter is sensed by a sensor in the microscale autonomous sensor and communications module. For instance, a photovoltaic cell can be employed to sense the environmental parameter.

At 506, an electric voltage is output based at least in part upon the sensed environmental parameter. In other words, the photovoltaic cell can output electric voltage upon receiving electromagnetic radiation in a particular wavelength. This electric voltage can also be referred to as a sensor signal that is output by the photovoltaic cell. At 508, an output signal is generated by an integrated circuit based at least in part upon the sensor signal. That is, the integrated circuit receives the sensor signal from the photovoltaic cell and outputs an output signal in accordance with executable instructions in memory of the integrated circuit and/or a state of the module.

At 510, the output electric voltage is selectively directed to a battery, the integrated circuit, and/or an optical emitter. The integrated circuit can monitor the voltage level received from the photovoltaic cell, as well as the energy level of a battery, and can cause the voltage to be selectively directed to the battery, the integrated circuit, or the optical emitter.

At 512, the optical emitter is caused to generate an optical signal based at least in part upon the output signal. The output signal may have a certain voltage level that causes the optical emitter to output an optical signal of a certain wavelength and amplitude (and at a certain frequency). The methodology 500 completes at 514.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A microscale autonomous sensor and communications module, the module comprising:
   an energy storage device;
   an integrated circuit that comprises a memory that includes executable instructions;
   a sensor that is electrically connected to the integrated circuit, the sensor outputs a sensor signal that is indicative of at least one environmental parameter pertaining to the module, and wherein the integrated circuit generates an output signal based at least in part upon the sensor signal and the executable instructions in the memory; and
   an optical emitter that is electrically connected to the integrated circuit, the optical emitter outputs an optical signal responsive to receipt of the output signal from the integrated circuit, wherein the energy storage device is configured to provide electric power to the integrated circuit, the sensor, and the optical emitter, and wherein the module has a size of less than two millimeters in diameter and less than two millimeters in thickness.

2. The module of claim 1, the optical emitter being one of a light emitting diode or a vertical cavity surface emitting laser.

3. The module of claim 1, the module being less than one millimeter in diameter and less than one millimeter in thickness.

4. The module of claim 1, the module being less than 50 micrometers in thickness.

5. The module of claim 1, the sensor being a photovoltaic cell that is configured to output voltage responsive to receipt of electromagnetic radiation of a particular wavelength.

6. The module of claim 5, the energy storage device being a rechargeable battery, the integrated circuit configured to monitor an energy level of the rechargeable battery, the integrated circuit selectively directing the voltage to at least one of the rechargeable battery or the optical emitter based at least in part upon the energy level of the rechargeable battery monitored by the integrated circuit.

7. The module of claim 6, the integrated circuit causing the voltage output by the photovoltaic cell to be directed towards the rechargeable battery if the energy level of the rechargeable battery is below a threshold.

8. The module of claim 6, the integrated circuit causing the voltage output by the photovoltaic cell to be directed towards the optical emitter if the energy level of the rechargeable battery is above a threshold.

9. The module of claim 5, the photovoltaic cell comprising a positive contact and a negative contact that are on one side of the photovoltaic cell.

10. The module of claim 1, the sensor and the optical emitter being integrated as a single module.

11. The module of claim 1, wherein the optical emitter and the sensor are electrically coupled to the energy storage device by way of the integrated circuit.

12. The module of claim 1, wherein the memory retains a state of the module, and wherein the output signal is based at least in part upon the state.

13. The module of claim 1, wherein the energy storage device is electrically coupled to the integrated circuit by a first set of electrical contacts, wherein the integrated circuit is electrically coupled to the sensor by a second set of electrical contacts, and wherein the integrated circuit is electrically coupled to the optical emitter by a third set of contacts.

14. A method, comprising:
   receiving an energy storage device;
   receiving an integrated circuit;
   electrically coupling the energy storage device with the integrated circuit;
   receiving a sensor;
   electrically coupling the sensor with the integrated circuit;
   receiving an optical emitter; and
   electrically coupling the optical emitter with the integrated circuit, wherein the sensor and the optical emitter are configured to receive electric power from the energy storage device by way of the integrated circuit, and wherein the energy storage device, the integrated circuit, the sensor, and the optical emitter being packaged together as a microscale autonomous sensor and communications module that is less than two millimeters in thickness and less than two millimeters in diameter.

15. The method of claim 14, the sensor being a photovoltaic sensor.

16. The method of claim 15, the photovoltaic sensor having a first side and a second side, and wherein both a positive electrical contact and a negative electrical contact are on the first side of the photovoltaic sensor.

17. The method of claim 14, the energy storage device being one of a rechargeable thin film battery, a capacitor, or an ultra-capacitor.

18. The method of claim 14, further comprising:
   subsequent to electrically coupling the optical emitter with the integrated circuit, coating the microscale autonomous sensor and communications module with a protective polymer.

19. The method of claim 14, the integrated circuit comprising executable instructions that cause the optical emitter to output an optical signal without reference to data output by the sensor.

20. An autonomous sensor and communications module, comprising:

sensor means for sensing an environmental parameter and outputting a sensor signal that is indicative of the environmental parameter;

integrated circuit means for processing the sensor signal in accordance with executable instructions programmed thereon to generate an output signal;

emitter means that receives the output signal and selectively emits an optical signal based at least in part upon the output signal; and battery means for providing electric power to the sensor means, the integrated circuit means, and the emitter means, wherein the autonomous sensor and communications module is less than one millimeter in thickness and less than one millimeter in diameter.

* * * * *